Nov. 15, 1938.  I. D. PERRY  2,136,520
RESILIENT VALVE FOR BLADDERS AND THE LIKE
Filed Aug. 11, 1933
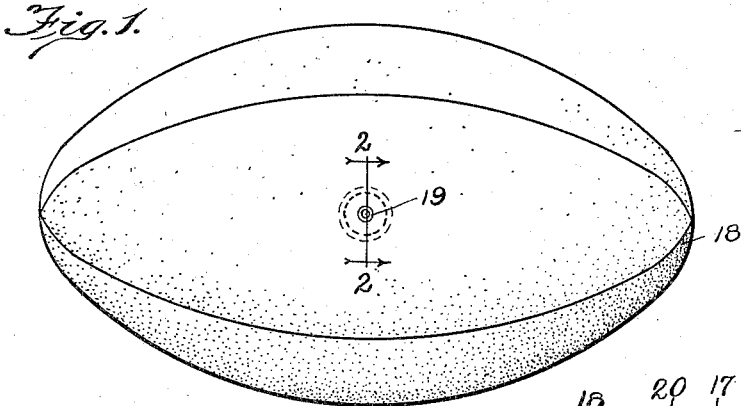
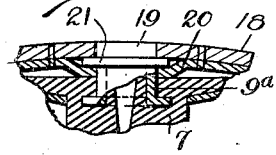
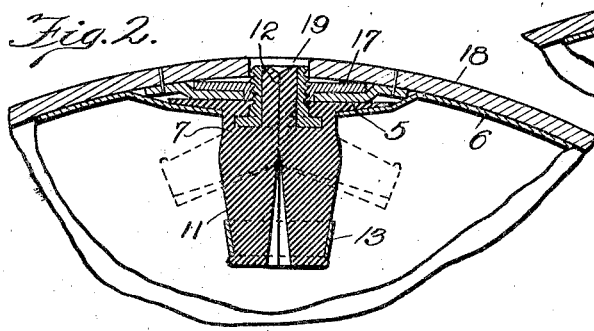
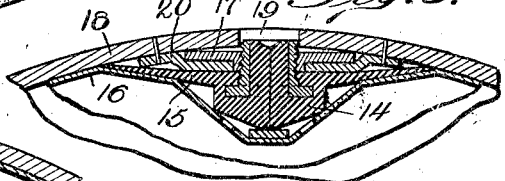
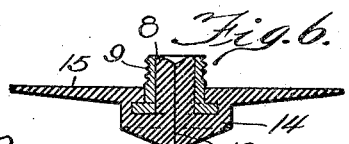
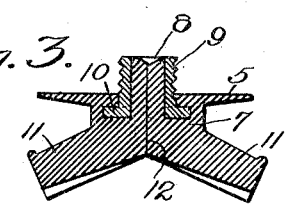
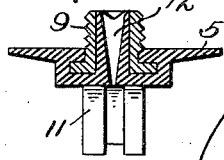
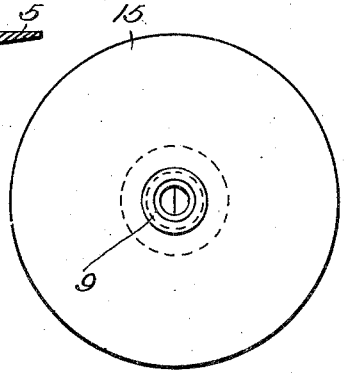
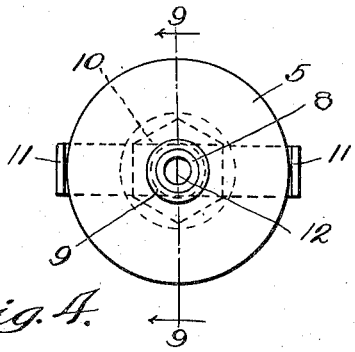
Inventor:
Ira D. Perry
By [signature]
Atty.

Patented Nov. 15, 1938

2,136,520

UNITED STATES PATENT OFFICE 2,136,520

RESILIENT VALVE FOR BLADDERS AND THE LIKE

Ira D. Perry, Chicago, Ill., assignor to Everett G. Clements, Washington, D. C.

Application August 11, 1933, Serial No. 684,717

13 Claims. (Cl. 273—65)

My invention relates to improvements in rubber valves for inflatable articles, having an outer cover or casing usually formed of non-extensible material and an inner inflatable bag or bladder, such as footballs, basket-balls, punching bags, etc.

More particularly my invention relates to means which is formed in part with such valves as were first disclosed and claimed in my co-pending application Serial No. 651,381, filed Jan. 12, 1933, now Patent 1,923,501 of August 22, 1933, and my Patent 1,910,961 of May 23, 1933, whereby the valve, after being permanently attached to a bladder, may be detachably secured to a casing or cover of a playball, or a part carried by the casing, so that the inflating and deflating portion of the valve is held in definite and fixed relation relative to an opening of minimum dimensions in a wall of the casing.

It is, therefore, an object of my invention to provide a valve of the character set forth and having a body and operating portions composed of resilient and flexible material, such as rubber, and a nozzle or inflating and deflating end portion composed, at least in part, of a relatively rigid material, such as a metal, whereby the valve may be readily attached to a bladder to form a wall portion thereof and provide means of minimum dimensions for detachably mounting the bladder within the casing of a playball with the air inlet and outlet of the valve in fixed communication with an opening in a wall of the casing.

Another object of my invention is to provide a valve for playballs having no rigid or relatively movable operating parts and which is so constructed and arranged as to be dirt-proof, eliminating the necessity of covering portions for the casing opening and valve.

A further object is to provide a valve which may be quickly and easily attached to or detached from casings or playballs and which will be light in weight and more flexible adjacent said point of attachment than valves heretofore proposed for this purpose.

A still further object of my invention is to provide a valve of this character which may be manufactured and installed with the minimum of expansion in materials, labor and time, and which is so constructed that a very perfect sealing action is produced, without requiring the use of special devices for closing the air passage of the valve.

These and other objects and advantages as will hereinafter appear, are accomplished by this invention, which is fully described in the following specification and shown in the accompanying drawing, in which:—

Fig. 1 is a view of a football embodying the features of the present invention;

Fig. 2 is an enlarged sectional view through the valve and its fastening means, as indicated at 2—2 in Fig. 1, the resilient portions of the valve being in operative relation to seal air under pressure within the bladder of the playball;

Fig. 3 is a sectional view of the valve element shown in Fig. 2 with the resilient portions thereof in relaxed, extended positions;

Fig. 4 is a top plan view of the valve element shown in Fig. 3;

Fig. 5 is a view similar to Fig. 2, showing a different type of resilient valve having means for quickly and positively attaching the same to a playball casing;

Fig. 6 is a sectional view of the valve element shown in Fig. 5, and embodying the features of the present invention;

Fig. 7 is a top plan view of the valve element shown in Fig. 6;

Fig. 8 is a fragmentary view of a valve body partly in section and showing a modified form of quick detachable means for securing valves of the type herein illustrated to casings of playballs; and Fig. 9 is a sectional view taken on line 9—9 of Fig. 4.

The valve of the instant case comprises a flexible disk-like portion 5, of rubber or other similar material, which portion is adapted to be cemented to a wall 6 of a bladder, as illustrated in Figs. 2 and 5 to form an integral flexible portion of the wall.

At one side of the disk 5 is integrally formed a relatively thick resilient body portion 7 and on the opposite side of the disk is formed a small inflating lug or neck 8 which projects outwardly from the center of the disk and body portion through the bore of the metal sleeve or fitting 9 which it substantially fills. In Figs. 2 to 7 and 9 inclusive the sleeve 9 is shown externally threaded and provided with an annular multi-sided flange 10 at its inner end, which flange is imbedded and thus anchored in the material of the valve body 7 which is moulded thereabout. The valve body 7 as shown in Figs. 2 to 4, inclusive, is formed with spaced wing or lug portions 11 which in normal relaxed condition of the parts will extend inwardly and laterally from the body providing a substantially inverted V-shaped notch or opening between the longitudinally grooved opposed faces of the lugs 11. A self-closing through passageway or slit 12 is formed through the center of the inflating lug 8 and valve body 7 by forcing a sharp tapered piercing instrument of bayonet construction through the center of the lug 8 and resilient material of the body 7, the elongated substantially V-shaped slit thus formed terminating at the center or apex of the inverted V-shaped opening between the compression lugs 11, as shown in Fig. 9.

The tapered construction or shape of this inflating and deflating slit 12 through the lug 8 and body 7 is important in that friction is thus largely eliminated when inserting a pump needle therethrough. Wear on the normally abutting walls of the slit is thus reduced to a minimum, insuring perfect sealing of the passageway when the wing or lug portions 11 are deflected and secured in abutting relation by the band 13 to effectively compress or pinch the intermediate resilient material of the body through which the tapered slit or passageway 12 extends, as shown in Fig. 2.

While I have shown the slitted inflating lug 8 of such length as to extend substantially through the tubular metal insert or sleeve 9 it will be understood that this construction and arrangement of parts is unnecessary to the normal successful operation of the valve, its function being to render such fitting dirtproof, without requiring the use of special devices for closing the opening in the playball casing or valve fitting and to provide a substantially rigid and frictionless self-closing guide for a pump needle.

In Figs. 5 to 7, inclusive, I have shown the tubular, externally threaded fitting 9 molded in the body of a quite different type of resilient valve, this valve being specifically described and claimed in my Patent 1,910,961. Briefly, this valve comprises a thickened resilient body portion 14 which depends from the central portion of a flexible disk-like portion 15 adapted to be cemented to a wall 16 of a bladder so that the bladder wall forms a resilient operating portion of the valve as shown in Fig. 5.

In each case, however, the resilient material of the body and its inflating lug or neck portion 8 is centrally slitted as at 12 to provide a self-closing substantially V-shaped passageway for receiving and guiding a pump needle and this portion 8 is surrounded and supported by a relatively rigid externally threaded tubular fitting 9.

While I have previously described the tubular fitting 9 as formed of metal it will be obvious that other relatively hard materials may be substituted, such as hard rubber, Bakelite, etc., as its function is to provide in a resilient valve a light and relatively rigid means of minimum dimensions for readily and quickly securing the valve and its attached bladder to an internally threaded member carried adjacent the inner face of a playball casing. By reference to Figs. 2 and 5 it will be seen that the internally threaded member may take the form of a nut or plate 17 having an internally threaded opening.

The nut 17 is securely held against the inner face of the casing wall 18 with its threaded opening in registration with a similar opening 19 in the casing wall by a covering strip 20 of suitable material, such as leather, fabric, etc., which is stitched around the nut to the casing 18 so as to overlie the unapertured portion of the nut and prevent chafing of a bladder placed within the casing.

In Fig. 8 I have shown a modified form of tubular fitting 9a for quick detachable connection with a strip or tongue 20 secured adjacent the inner face of a playball casing 18.

In this form of fitting the screw threads and an internally threaded plate or nut 17 are replaced by an integral button-like head formed by a flange 21 at the outer end of the smooth tubular fitting 9a. This construction not only permits of quick attachment or detachment of the bladder to the casing 18 by passing the head 21 through a buttonhole slit in the strip or tongue 20, but also eliminates the weight of extra, rigid parts at this point in the casing wall. When attached, the head 21 will be held firmly between the opposed faces of the strip 20 and casing 18 adjacent the inflating opening 19 in the casing.

While I have described and shown but a few embodiments of my invention, it is to be understood that it is capable of many modifications. Changes, therefore, in the construction and arrangement may be made which do not depart from the spirit and scope of the invention as disclosed in the appended claims.

I claim:—

1. In an inflatable article having an outer casing and a removable bladder, said bladder having a relatively thickened wall portion of resilient and flexible material which is transversely slitted to provide a self-closing passageway therethrough, and a rigid fitting carried by said portion and surrounding and supportingly embracing the resilient and flexible material adjacent said passageway, said fitting having means for detachable engagement with said outer casing.

2. In an inflatable article having an outer casing and a removable bladder, a self-closing valve comprising a body of resilient and flexible material carried by a wall portion of said bladder and cooperating therewith to close the valve, and rigid means surrounding and embracing the resilient and flexible material of said body to form a rigid outer extension of said valve for detachable engagement wth said outer casing.

3. In an inflatable article having an outer casing and a removable bladder, a self-closing valve comprising a body of resilient and flexible material having a passageway extending therethrough and means for securing said body to a wall of said bladder, a fitting partially imbedded in the material of said body to embrace the material surrounding said passageway and projecting therebeyond, whereby said passageway extends through said body and fitting, said fitting having means for detachable engagement with said outer casing.

4. An air valve for bladders and the like comprising a flexible body member having a rigid casing attaching fitting partially imbedded therein to project from one side thereof, said body having a resilient and flexible self-sealing bladder inflating portion extending into and normally closing the inner end of said fitting.

5. An air valve for bladders and the like comprising a flexible body member having a relatively rigid casing attaching fitting projecting from one side thereof, said body having a resilient and flexible self-sealing bladder inflating portion extending into and normally closing the inner end of said fitting, and means carried by said body for maintaining the material of said last-named portion under compression adjacent the inner end of said fitting.

6. An air valve for bladders and the like comprising a thickened body of resilient and flexible material having a self-sealing bladder inflating portion, a relatively rigid casing attaching fitting secured therein so as to surround said bladder inflating portion and project from one side thereof, spaced lugs projecting from the opposite side of said body, said lugs having cooperating side faces adapted to be secured in abutting relation, whereby to compress the resilient and flexible material of said body adjacent the inner end of said fitting.

7. An air valve for bladders and the like comprising a thickened body of resilient and flexible material having a relatively rigid, tubular casing attaching fitting secured therein so as to project from one side thereof, said body having a resilient and flexible self-sealing bladder inflating portion extending into said fitting, compression lugs normally extending laterally from the opposite side of said body in diverging relation and having cooperating side faces adapted to be secured in abutting relation, whereby to compress the resilient and flexible material of said body and bladder inflating portion adjacent the inner end of said tubular fitting.

8. An air valve for bladders and the like comprising a resilient and flexible body member having a passageway therethrough, and a tubular rigid casing attaching fitting immovably carried by said body and supportingly embracing the resilient and flexible material surrounding said passageway within said tubular fitting.

9. An air valve for bladders and the like comprising a resilient and flexible body having a rigid externally threaded tubular fitting projecting from one side thereof, the resilient and flexible material of said body extending into and substantially filling said fitting and providing a self-sealing bladder inflating portion, and means to secure said body to a wall of said bladder.

10. An air valve for bladders and the like comprising a resilient and flexible body having a rigid tubular fitting projecting from one side thereof, said fitting having means for detachable connection with an outer casing, the resilient and flexible material of said body extending into and substantially filling said fitting, and a substantially V-shaped passageway extending through the resilient and flexible material centrally of said fitting.

11. An air valve for bladders and the like comprising a resilient and flexible body member having a rigid tubular fitting projecting from one side thereof, said fitting having an external thread for detachable connection with an outer casing, the resilient and flexible material of said body extending into and substantially filling said tubular fitting, a substantially V-shaped slit extending through the resilient and flexible material of said body centrally of said fitting, and normally spaced lug means extending laterally from the opposite side of said body in diverging relation and having cooperating side faces adapted to be secured in abutting relation, whereby to compress the slitted material of said body adjacent the inner end of said fitting.

12. A valve for bladders and the like comprising a one piece rubber valve body having a self-sealing passageway extending therethrough, and a tubular relatively rigid casing attaching fitting imbedded in the body material surrounding the passageway and projecting from one side of said body.

13. A valve for bladders and the like comprising a flexible rubber valve body and a tubular relatively rigid casing attaching fitting imbedded in the body so as to project from one side thereof, the resilient and flexible material of the body extending into and substantially filling said tubular fitting and having a normally closed inflating passageway extending therethrough.

IRA D. PERRY.